March 17, 1936.  J. V. MacDONOUGH  2,034,479
UREA-FORMALDEHYDE CONDENSATION PROCESS
Filed April 1, 1930
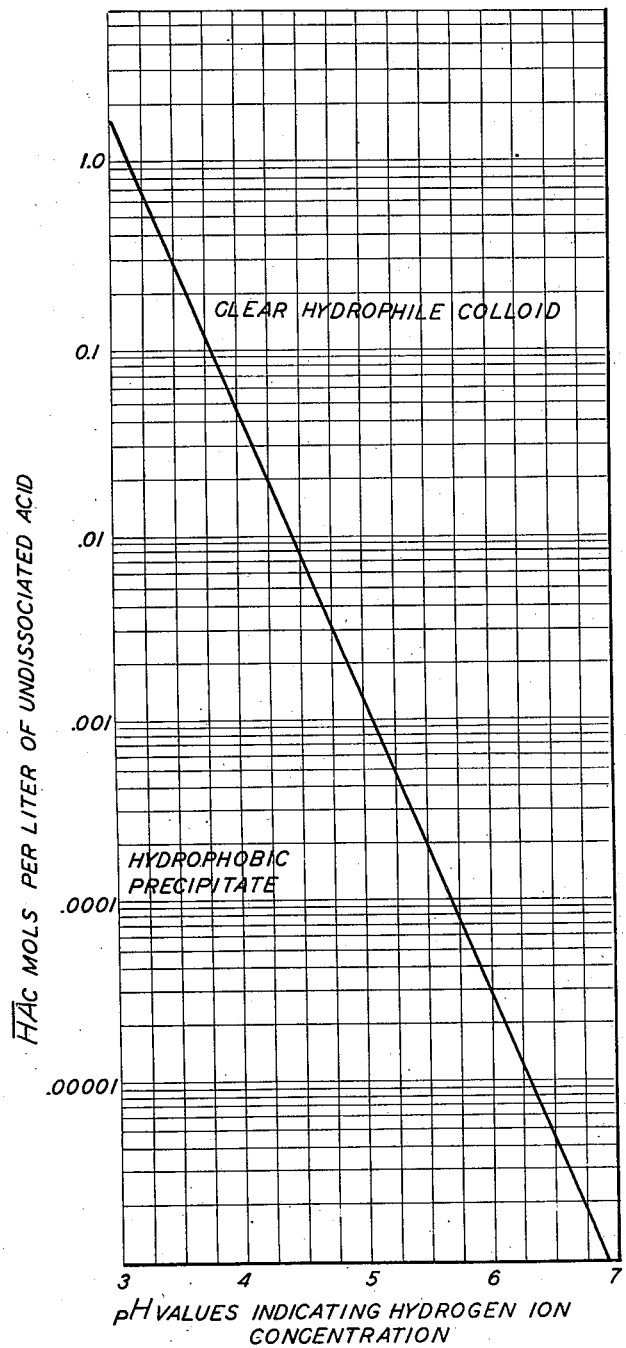

Patented Mar. 17, 1936

2,034,479

UNITED STATES PATENT OFFICE 2,034,479

UREA-FORMALDEHYDE CONDENSATION PROCESS

John Vincent MacDonough, Watertown, Mass., assignor to Arthur D. Little, Incorporated, Cambridge, Mass., a corporation of Massachusetts Application April 1, 1930, Serial No. 440,694

4 Claims. (Cl. 260—3)

This invention relates to the manufacture of reaction products of formaldehyde with urea and more particularly to a method of securing as a final or intermediate product of the reaction a polymerized hydrophile colloid.

Some objects of the invention are to provide a method of carrying on the reaction under controlled conditions to render certain that the hydrophile form of the polymerized colloid will be formed and will be available after polymerization has been carried to the desired degree, to prevent the product from being turbid through the formation therein of a hydrophobic colloid or precipitate, and to insure a uniformity of degree of polymerization of the product. Additional objects are to permit the condensation and polymerization steps necessary to the formation of such a desired product to be carried on rapidly without unnecessary excess of formaldehyde and in such a way as to avoid the necessity of varying the acidity or alkalinity of the electrolyte during heating.

While my process is primarily concerned with the manufacture of the colloid in solution, my invention aims so to carry on the manufacture that the resulting colloid will be eminently suited to a wide variety of uses thereafter, and will be of high quality in its subsequent solidified state.

I have discovered that an acid electrolyte containing urea and formaldehyde can be prevented from precipitating the hydrophobic form of the colloid and can be made to produce invariably the hydrophile colloid which I aim to produce, if the proper relation is established between the concentrations of hydrogen ion and undissociated acid of the solution.

One desirable feature of the process of my invention resides in its capability of being carried out under a wide range of conditions of acidity of the reaction solution. I have found that apparently the solution must be acid if polymerization is to take place within any reasonable time, and that the speed of the reaction is much faster when the acidity of the solution is high during polymerization than when it is low. Thus by utilizing a solution which is rather highly acid, the process may be carried out with great rapidity.

By initially preparing an acid solution according to my invention, preferably with an acidity sufficiently high for rapid polymerization, it is unnecessary later (for example after condensation of the urea and formaldehyde has taken place) to add acid or to remove a volatile base by distillation (drive off alkali) for the purpose of permitting polymerization to proceed through heating of the solution. This constitutes a distinct advantage since the heating step of the operation may be carried on without difficulties or delays attendant upon adjusting acidity of the solution at this stage. The difficulty of adding acid to the hot solution, with consequent tendency to cause local precipitation of hydrophobic colloid, or necessity of stirring at this stage, or of adding a greatly diluted acid is thus avoided. Likewise my process avoids the delay in polymerization which would be caused by distilling off a volatile alkali to increase the acidity of the solution during the heating step, as well as the danger of distilling off so much alkali that the ratio of undissociated acid to ionized hydrogen becomes small enough to cause precipitation of hydrophobic colloid.

My invention therefore provides a way of preparing a solution which when properly heated will invariably produce the desired hydrophile colloid in a way which is both reliable and simple.

Furthermore my invention permits the practical manufacture of hydrophile reaction products from a solution containing both formaldehyde and urea, without substantial excess of formaldehyde, the solution preferably containing formaldehyde and urea approximately in the theoretical ratio of about two mols of formaldehyde to one mol. of urea, and there being no necessity in carrying out my process to employ such an excess of formaldehyde as would be present if say five mols of formaldehyde were employed for every mol. of urea.

I have discovered that while the acidity of the solution is quite important, it gives merely a negative indication of the character of the colloid which will be formed, (for example solutions having pH values of less than 3 will not yield hydrophile colloids), and merely controlling the acidity of the solution will not insure the production of the desired hydrophile form of colloid in a clear state. Acid solutions having pH values of from 3 to 7, (which is the acidity range in values from 3 to 7, (which is the acidity range in which I find polymerized hydrophile colloids may be produced) often yield upon heating white hydrophobic precipitates which cause cloudiness of the finished product. I have discovered however that the course of the reaction may be determined to yield invariably clear hydrophile colloids by utilizing an acid solution having a pH value of from 3 to 7 and having the ratio of the concentration of the undissociated acid to the hydrogen ions therein increased sufficiently to satisfy the relation expressed in the following equation:

$$M=\log \overline{HA}+1.56(\text{pH}) \quad \text{or} \quad M=\log \frac{\overline{HA}}{(H^+)^{1.56}}$$

wherein:

$\overline{HA}$ represents the concentration of undissociated acid in mols. per liter, pH represents the hydrogen ion concentration as determined by the colorimetric system, using the standard Lamotte buffer solutions and testing the solution when cold, and H+ represents the concentration of hydrogen ions in mols. per liter; pH being equal to log $\frac{1}{H^+}$;

and

M exceeds a certain minimum value.

I have made repeated experiments to determine the minimum permissible value of M in the above equation compatible with obtaining a clear unclouded hydrophile colloid as a product. The great majority of my experiments have shown that an acid solution having its ratio of concentration of undissociated acid to concentration of hydrogen ions increased, by the incorporation in the solution of salt-forming elements, to such an extent that M in the above equation equals or exceeds 4.85, will yield, upon heating, the desired clear hydrophile colloid. I therefore conclude that as a theoretical rule, the ratio of concentration of undissociated acid to the concentration of hydrogen ions should be such that M in the above equation will be greater than 4.85.

However, to insure a margin of safety and to guard against danger of error in my necessarily intricate experiments, observations and calculations leading to my discovery of this empirical formula, I should advise establishing such a ratio between the concentration of undissociated acid and the concentration of hydrogen ions in the solution that M in the equation given above will equal or exceed 5.

Repeated experiments have shown that if the relation of the hydrogen ion concentration to the concentration of undissociated acid is such that M in the above equation is less than 4.85, a relatively insoluble hydrophobic powder is formed which renders the product cloudy.

Referring to the accompanying drawing the heavy diagonal line indicates the minimum value of pH for any given molar concentration of undissociated acid, or the minimum concentration of undissociated acid for any given value of pH which will satisfy the above equation to give the minimum allowable value of M of 4.85. Solutions having pH and $\overline{HA}$ values falling to the right of the diagonal line yield in general clear hydrophile colloids, while those having pH and $\overline{HA}$ values falling to the left of the diagonal line yield hydrophile colloids having at least some hydrophobic precipitate, and hence cloudiness. It should be understood that this diagonal line was obtained by plotting a line through a large number of points obtained by actual experiment. As would be expected a few of the points varied slightly from the line, but not far enough to raise doubt that the diagonal line represents a close approximation to the division between the hydrophile and hydrophobic fields.

In the carrying on of my process the reaction solution comprising mainly water, formaldehyde and urea is rendered acid to the extent of having a pH value of between 3 and 7 preferably by the presence therein of a weak acid, such for example as formic acid or acetic acid or both. I prefer, in order to carry on the reaction quickly, to use solutions having pH values of from 3.5 to 4.5. However, the presence in the solution of formic or acetic acids, or other weak acids, in quantities sufficient to give a pH value of between 3 and 7 will not in itself establish the required relation of the undissociated acid to the hydrogen ion concentration, but will render the value of M in the above equation too low. A preferable way of establishing the proper relation between the concentration of undissociated acid and the hydrogen ion concentration is to incorporate in the solution a sufficient quantity of a salt of an acid having a dissociation constant of less than $10^{-3}$, for instance a salt of acetic or formic acid, and preferably the salt of one of the acids present. Such salt (which will be present largely in a dissociated state) has the effect of increasing the ratio of the concentration of the undissociated acid to the concentration of hydrogen ion in the electrolyte and the presence in the acid solution of sufficient quantity of such salt will serve to maintain these concentrations at such relative values that M in the above equation exceeds 4.85, thus preventing in general the precipitation of the hydrophobic form of colloid. Obviously this salt may be added as such to the acid solution in the course of its preparation, or more conveniently one or more suitable acids may be partially neutralized to the desired degree within the solution by means of a basic substance, the necessary quantities of salt forming elements thus being supplied by the reaction of the acid and the base.

According to the most convenient way of preparing the reaction solution having a pH value corresponding to any desired degree of acidity, (for instance, say a pH of 4.0), the total necesary acid content is provided by first incorporating the necessary amount of acid in a commercial formaldehyde solution. Commercial formaldehyde solutions generally contain formic acid as an impurity, but it is usually necessary to supplement this initially present formic acid with other weak acid, for instance acetic acid or formic acid. The acid should be present in sufficient quantity to yield enough undissociated acid at the predetermined pH value to give (after the addition of alkali) a value of M in the above equation greater than 4.85. Upon obtaining the desired acid content in the formaldehyde solution, a controlling substance whose aqueous solution would have a pH value greater than 7 (for instance sodium hydroxide) is added in sufficient quantity to bring the pH value to the predetermined figure, in this case 4.0. The urea, which has little effect on the acidity of the solution, is then added. In this way there is presumably present in the electrolyte, in addition to the main reactant ingredients (urea and formaldehyde), a quantity of undissociated acid, free hydrogen ions and an ionized salt yielding through hydrolysis negative ions corresponding to the negative ion of the undissociated acid of the solution. The salt incorporated in the solution in increasing the ratio of undissociated acid to hydrogen ion preferably has for its positive ion one of the alkali metals, for instance sodium as in the above described example. The alkali metal salts are desirable in that they have in general the characteristic of high solubility and absence of color in solution, and do not cause cloudiness of final solidified colloid products even after loss of water by the product upon standing or being heated and pressed.

Furthermore the alkali metal salts are much more effective than corresponding salts of heavier metals in controlling conditions of acidity in the solution. Accordingly the alkali metal salts, (or the acid and basic substances for forming them) may be employed in much smaller quantities than in the case of correspondingly effective salts of heavier metals. Thus by using an alkali metal salt, a greater purity of the final product is attained.

It should be noted however that the salt incorporated within the solution, whether added as such or formed in an ionized state therein, primarily serves to perform a controlling function with respect to the ratio of undissociated acid to hydrogen ion in the solution during manufacture. Accordingly a wide variety of salts may be utilized for performing this controlling function within the scope of certain phases of my invention, as pointed out in appended claims.

For the purpose of rendering explicit a method of determining the molar concentration of undissociated acid, I may here explain that this value, designated in this specification by the term $\overline{HA}$, may be obtained for any given acid constituent of the solution by means of the following equation:—

$$\overline{HA} = \frac{W \times 1000 \times \frac{H^+}{K+H^+}}{V \times Wm}$$

wherein

W is the weight in grams of the total acid present in the solution, including the weight of an amount of acid equivalent to the salt of the acid contained in the solution.

$H^+$ is the observed hydrogen ion concentration in mols. per liter

K is the dissociation constant for the given acid

V is the volume of the solution in cubic centimeters, and

Wm is the molecular weight of the acid.

Obviously if two or more acid radicals, such for example as those of both acetic and formic acid, are present in the solution, the molar concentration of the undissociated portion of each of the acids may be ascertained separately as outlined above, and then added to give the combined value of $\overline{HA}$ for the solution.

The foregoing procedure provides in practice an accurate method for the technical control of these operations. It will not, however, be found necessary in routine operation to employ these determinations and calculations once the principle is established and practical working formulas based thereon have been worked out.

After preparation of the solution, heat may be applied thereto to promote polymerization. During this heating of the solution, preferably under a reflux condenser or in any apparatus suitable to confine and retain the reactant and other ingredients of the solution (and preferably also the water content), the acidity of the solution may be maintained substantially constant. After heating for the necessary time, dependent as explained below upon the acidity of the solution, heating may be discontinued and the solution will be found to be a polymerized hydrophile colloid, clear either when hot or cold. As explained above, the heating of the solution in this manner avoids the difficulties and uncertainty attendant upon altering the acidity of the solution during heating.

As specific instances of carrying on my process I cite the following examples wherein I have produced the desired products in a simple manner and from formaldehyde and urea in the economical ratio of about 2 mols. of formaldehyde to 1 mol. of urea:—Wherever I use the term (or symbol for) acetic acid, or formic acid, I mean actual 100% (or anhydrous) acid.

*Example 1.*—1.05 grams of acetic acid was added to 100.0 grams of 40% (by volume) formaldehyde (commercially otherwise known as formalin solution) containing 0.06 grams of formic acid. Two cubic centimeters of normal sodium hydroxide solution were added. The pH value of the resulting solution was 3.6. 35.3 grams of urea was dissolved in the above, and the pH of the resulting solution was 3.7. The solution was then heated on a water bath at 212° F. under a reflux condenser. Heating was continued for six minutes after the reaction had commenced (as evidenced by ebullition). The resulting product was a clear, water-white, transparent solution of a water-soluble product. The solution also remained clear when cooled down to 38° F. The pH of the reaction mixture in this example was 3.7 and the value of M was 4.92.

*Example 2.*—(Carried on in a manner similar to Example 1)
   100.0 grams of "40% formaldehyde" which contained 0.06 grams of formic acid.
   0.65 grams of formic acid.
   9.6 cc. of normal sodium hydroxide solution.
   35.3 grams urea.
   Resulting pH value=4.1
   Temperature of water bath=212° F.
   Time of reaction—about 12 minutes
   Value M=4.91
   Product clear hot and when cooled to 38° F.

*Example 3.*—(Carried on in a manner similar to Example 1).
   100.0 grams of "40% formaldehyde" which contained
   0.06 grams of formic acid.
   0.09 grams acetic acid.
   1.3 cc. normal sodium hydroxide.
   35.3 grams urea.
   Resulting pH value—4.4
   Temperature of water bath—212° F.
   Time of reaction—about 25 minutes.
   Value M=4.88
   Product clear hot and when cooled to 38° F.

*Example 4.*—(Carried on in a manner similar to Example 1).
   100.0 grams of "40% formaldehyde" which contained
   0.05 grams of formic acid.
   1.0 cc. normal sodium hydroxide.
   35.3 grams urea.
   Resulting pH value—6.0.
   Temperature of water bath—212° F.
   Time of reaction—about 16 hours
   Value M=5.06
   Product clear hot and when cooled to 38° F.

With reference to the foregoing examples the critical nature of the minimum allowable value for M (4.85) can be shown by effecting very slight changes in either $\overline{HA}$ or pH for which the following values apply in the above examples.

|  | Ex. 1 | Ex. 2 | Ex. 3 | Ex. 4 |
|---|---|---|---|---|
| (Mols.) total undissociated acid | .1374 | .0323 | .0102 | .00005 |
| Log total undissociated acid | −.862 | −1.491 | −1.991 | −4.301 |
| pH | 3.7 | 4.1 | 4.4 | 6.0 |
| M | 4.92 | 4.91 | 4.88 | 5.06 |

If, in these examples, the following changes are made in the total mols of undissociated acid a turbid reaction product is obtained.

*Example 1.*—Change mols of undissociated acid to .1121 reducing M to 4.83.

*Example 2.*—Change mols of undissociated acid to .0275 reducing M to 4.84.

*Example 3.*—Change mols of undissociated acid to .00926 reducing M to 4.78.

I have determined that if 100.0 grams of commercial 40% formaldehyde is employed, as in the above examples, the necessary minimum value of M may be obtained if certain quantities of acids are incorporated in the solution and the electrolyte is neutralized to certain pH values. For instance if formic acid alone is employed the following quantities of acid will suffice at certain pH values of the solution:—

0.22 g. formic acid, solution neutralized to pH 4.5.

1.88 g. formic acid, solution neutralized to pH 3.6.

If formaldehyde containing 0.06% formic acid is employed, and acetic acid is used in addition, the following quantities will suffice:—

0.09 g. acetic acid, solution neutralized to pH 4.4.

0.20 g. acetic acid, solution neutralized to pH 4.2.

1.05 g. acetic acid, electrolyte neutralized to pH 3.7.

The logarithms used throughout this application are common logarithms, that is, logarithms to the base 10.

As is apparent from the equation representing the critical relationship between $\overline{(HA)}$ and (pH), the same value of M can be obtained at different pH values by adjusting the molar concentration in the solution of the undissociated acid and of the hydrogen ion. In practice I prefer to operate near the low limit of the allowable pH range, which is between 3 and 7. At the lower pH the reaction is much more rapid than it is, for instance, between a pH of 5 and 7. The relationship between reaction time (T) and pH I find can be expressed by the equation:

$$pH = \log T + 4.801,$$ time (T) being expressed in hours.

(Temp.=212° F.)

At a pH of 3.5 the reaction can be completed in 3 minutes as contrasted with practically 7 days at pH=7.0.

From the foregoing it will be apparent that the speed of the reaction increases according to a logarithmic function of the pH value of the solution, progressive lowering of the pH value (increasing the concentration of hydrogen ion) thus effecting increases in speed of the reaction proportionately greatly exceeding the corresponding arithmetical decreases in pH value.

After completion of the reaction, especially when carried on at low values of pH, the colloid may if desired be stabilized by adding sufficient alkaline substance to raise the pH to about 5.8 or more. In this stabilized condition with a pH of 5.8 the colloid will remain liquid for about three months, while with a pH of 6 the colloid will remain liquid even longer.

The hydrophil colloid which I obtain has many practical uses, some of the more important of which are purely incidental to the fact that the formaldehyde-urea condensation and polymerization product in this form can be applied without the use of expensive, inflammable or toxic solvents. A few of the uses for which my product is specifically designed are:

1. This stable hydrophil colloidal product provides a convenient size for textiles. It has been found, for example, that this liquid when applied to textiles either in the stabilized form or preferably at a pH value between 3.0 and 4.0 imparts, after drying, a definite body to the cloth. Cloth so treated is waterproof and has a stiffened or "starched" condition which is not removed by laundering. It may be used, for example, to give permanent stiffness to shirts and collars, to waterproof cloth, to give improved "body" and texture to cloth, to stiffen fabrics so that they will maintain a more or less rigid and fixed shape, or to bind the fibers in cloth and rugs, etc., and thus prevent raveling. This material also makes a suitable sizing and surfacing for paper and other fibrous materials.

2. This initial product is also very valuable as a waterproof glue. The liquid if treated with any material which will lower the pH will set to a jell in a time depending upon the amount of acid added. If applied with the acid present it sets to a hard water-insoluble material.

3. This initial product may also be used to impregnate wood. The wood is first subjected to a vacuum, then the liquid is allowed to enter the pores of the wood, and finally pressure is applied further to force the liquid into the wood. For this purpose the pH value of the liquid is preferably between 3.0 and 4.0. After the impregnated wood has been first thoroughly air-dried and finally with aid of heat, it possesses a hard, rock-like structure and is fire, vermin and rotproof. This wood may be very readily ground.

4. The initial condensation and polymerization product is mixed with a fibrous or powdery filler of any kind, vegetable, animal or mineral, organic or inorganic. The resulting wet mass is dried at room temperature and finally at a slightly higher temperature (not over 120° F.). The resulting lumpy mass is reduced in a ball mill or other suitable mill to a fine, impalpable powder. This powder is permanently thermoplastic, may be converted by hot molding under pressure into objects of value in the arts and commerce and is somewhat similar in this respect to the so-called bakelite molding powders. It is desirable to mold at a temperature not lower than 290° F., and a pressure of not less than 2000 pounds per square inch.

It is advisable to avoid any contamination of the product with strong mineral acids. Small amounts of such acids as sulfuric and hydrochloric tend to make the end product unstable in the sense of accelerating jell formation.

I claim:

1. In the process of producing hydrophile condensation products of urea and formaldehyde in which one molecule of urea is reacted with two molecules of formaldehyde, the improvement therein which consists in providing an aqueous solution consisting of the total quantity of urea and formaldehyde and in addition thereto a quantity of undissociated acid, free hydrogen ions, and an ionizing salt, yielding a pH value for the solution of from 3 to 5, the ratio of undissociated acid to free hydrogen ions being sufficiently high that the sum of the logarithm of the molar concentration of undissociated acid plus the product of 1.56 times the pH value of the solution equals or exceeds 4.85, and heating the said solution to form a clear transparent water-soluble condensation product.

2. In the process of producing hydrophile condensation products of urea and formaldehyde in which one molecule of urea is reacted with two molecules of formaldehyde, the improvement therein which consists in providing an aqueous solution consisting of the total quantity of urea and formaldehyde and in addition thereto a quantity of undissociated acid, free hydrogen ions, and an ionizing salt, yielding a pH value for the solution of from 3 to 5, the ratio of undissociated acid to free hydrogen ions being sufficiently high that the sum of the logarithm of the molar concentration of undissociated acid plus the product of 1.56 times the pH value of the solution equals or exceeds 5, and heating the said solution to form a clear transparent water-soluble condensation product.

3. In the process of producing hydrophile condensation products of urea and formaldehyde in which one molecule of urea is reacted with two molecules of formaldehyde, the improvement therein which consists in providing an aqueous solution consisting of the total quantity of urea and formaldehyde and in addition thereto a quantity of undissociated acid, free hydrogen ions, and an ionizing salt, yielding a pH value for the solution of from 3.5 to 4.5, the ratio of undissociated acid to free hydrogen ions being sufficiently high that the sum of the logarithm of the molar concentration of undissociated acid plus the product of 1.56 times the pH value of the solution equals or exceeds 4.85, and heating the said solution to form a clear transparent water-soluble condensation product.

4. In the process of producing hydrophile condensation products of urea and formaldehyde in which one molecule of urea is reacted with two molecules of formaldehyde, the improvement therein which consists in providing an aqueous solution consisting of the total quantity of urea and formaldehyde and in addition thereto a quantity of undissociated monohydric acid, free hydrogen ions, and an ionizing salt, yielding a pH value for the solution of from 3 to 5, the ratio of undissociated acid to free hydrogen ions being sufficiently high that the sum of the logarithm of the molar concentration of undissociated acid plus the product of 1.56 times the pH value of the solution equals or exceeds 4.85, and heating the said solution to form a clear transparent water-soluble condensation product.

JOHN VINCENT MacDONOUGH.